(12) United States Patent
Calderoni

(10) Patent No.: US 10,487,601 B2
(45) Date of Patent: Nov. 26, 2019

(54) CONTROL EQUIPMENT FOR MONITORING FLOWS OF DRILLING MUDS FOR UNINTERRUPTED DRILLING MUD CIRCULATION CIRCUITS AND METHOD THEREOF

(71) Applicant: DRILLMEC SPA, Gariga di Podenzano (IT)

(72) Inventor: Angelo Calderoni, San Donato Milanese (IT)

(73) Assignee: DRILLMEC S.P.A., Gariga di Podenzano (PC) (IT)

( * ) Notice: Subject to any disclaimer, the term of this patent is extended or adjusted under 35 U.S.C. 154(b) by 67 days.

(21) Appl. No.: 15/570,033

(22) PCT Filed: Apr. 26, 2016

(86) PCT No.: PCT/IB2016/052354
§ 371 (c)(1),
(2) Date: Oct. 27, 2017

(87) PCT Pub. No.: WO2016/174574
PCT Pub. Date: Nov. 3, 2016

(65) Prior Publication Data
US 2018/0106118 A1   Apr. 19, 2018

(30) Foreign Application Priority Data
Apr. 28, 2015 (IT) .................. 102015000013304

(51) Int. Cl.
*E21B 21/01* (2006.01)
*E21B 21/06* (2006.01)
(Continued)

(52) U.S. Cl.
CPC ............. *E21B 21/08* (2013.01); *G01F 1/44* (2013.01); *G05B 17/02* (2013.01); *G05D 7/0617* (2013.01)

(58) Field of Classification Search
CPC ........... E21B 21/01; E21B 21/06; E21B 21/08
See application file for complete search history.

(56) References Cited

U.S. PATENT DOCUMENTS 2,872,810 A * 2/1959 Shaffer ................ G01F 1/44
285/115
3,613,806 A * 10/1971 Malott .................. E21B 21/08
166/75.11
(Continued)

FOREIGN PATENT DOCUMENTS

| EP | 2749854 A1 | 7/2014 |
|---|---|---|
| WO | 2012/154167 A1 | 11/2012 |
| WO | 2013/060847 A1 | 5/2013 |

OTHER PUBLICATIONS

International Search Report and Written Opinion from International Application No. PCT/IB2016/052354, dated Aug. 31, 2016.

*Primary Examiner* — Cathleen R Hutchins
(74) *Attorney, Agent, or Firm* — Merchant & Gould P.C.

(57) ABSTRACT

Control equipment monitors flows of drilling mud in a drilling mud circulation circuit. The equipment includes: at least one first inlet element, in turn having at least one first measuring device; at least one second outlet element, in turn having at least one second measuring device, and a processing and control unit electrically connected to both the first measuring device and the second measuring device. The processing and control unit receives measurement data from the first measuring device and the second measuring device. The equipment includes a third control element having at least one third measuring device. The processing and control unit is electrically connected to the at least one third mea- (Continued)

suring device; it receives measurement data from the third measuring device, and processes the data thus obtained by a model-based mathematical algorithm. The equipment includes a signaling device, which is electrically connected to the processing and control unit.

10 Claims, 9 Drawing Sheets

(51) Int. Cl.
*E21B 21/08* (2006.01)
*G01F 1/44* (2006.01)
*G05B 17/02* (2006.01)
*G05D 7/06* (2006.01)

(56) References Cited

U.S. PATENT DOCUMENTS

| | | |
|---|---|---|
| 2004/0178003 A1 | 9/2004 | Riet |
| 2006/0157282 A1 | 7/2006 | Tilton et al. |
| 2012/0292109 A1* | 11/2012 | Lovorn ................ E21B 21/08 175/25 |
| 2013/0180735 A1 | 7/2013 | Patel |
| 2014/0048331 A1 | 2/2014 | Boutalbi et al. |
| 2014/0202767 A1 | 7/2014 | Feasey |
| 2015/0083494 A1* | 3/2015 | Noske ................ E21B 21/10 175/48 |

* cited by examiner

CONTROL EQUIPMENT FOR MONITORING FLOWS OF DRILLING MUDS FOR UNINTERRUPTED DRILLING MUD CIRCULATION CIRCUITS AND METHOD THEREOF

This application is a National Stage Application of PCT/IB2016/052354, filed 26 Apr. 2016, which claims benefit of Serial No. 102015000013304, filed 28 Apr. 2015 in Italy and which applications are incorporated herein by reference. To the extent appropriate, a claim of priority is made to each of the above disclosed applications.

BACKGROUND OF THE INVENTION

The present invention relates to a control equipment for monitoring flows of drilling mud. The present equipment is suitable for application to circuits for uninterrupted mud circulation in a drilling rig. The equipment according to the present invention can control the flows of drilling mud by monitoring intrinsic parameters of the mud flows circulating in the circulation circuit included in a drilling rig. The equipment allows monitoring the drilling process during all operating phases of the drilling rig, thus acting as a safety system for both the drilling rig itself and the personnel. The present invention also relates to a method for controlling the mud circulation circuit by monitoring the intrinsic parameters of the circulating mud flows, thus allowing the drilling process to be continuously monitored during all of its operating phases and eliminating the current interruptions that occur in the drilling process when the pump is stopped before adding a stand of drill pipes.

According to the well drilling and control rules, at least two durable and reliable protection barriers must be available during the drilling process, for the purpose of preventing serious accidents such as, for example, uncontrolled leakage of hydrocarbons from the well (blowout), which might result in severe damage to people, environment, and assets.

Furthermore, the well drilling and control rules require the presence of a tested and reliable primary barrier, of the hydraulic type, consisting of drilling mud pumped through the set of pipes inserted in the well and the drill bit in wellbore, in order to facilitate the drilling process. Said mud must have a gradient greater than the gradient of the pores of the rocky formation to be drilled, so as to prevent any uncontrolled leakage of hydrocarbons or even a collapse of the drilling well. This hydraulic barrier is referred to as primary barrier.

The same rules require the presence of a secondary barrier, of the mechanical type, consisting of cemented wellbore casings and safety equipment installed at the wellhead, such as a blowout preventer, also known as BOP.

Mud circulation circuits are known from patent application US2004/178003 in which at least a part of the fluid flow coming from the main mud pump is diverted towards the mud discharge outlet in order to create a backpressure system that controls the pressure inside the annulus. According to the solutions described in the above-mentioned patent, mud circulation towards the bottom of the well is not continuous; in fact, when drill pipes need to be added or removed, the fluid flow is diverted, thus being no longer directed towards the bottom of the drilling well, and the annulus is pressurized.

It is known from patent application WO2013/060847 an inflow control device for controlling the flow of fluid into a well tubular structure arranged in a borehole, comprising a tubular part for mounting as part of the well tubular structure, an aperture provided in a wall of the tubular part, and a hollow valve organ rotatably received inside the tubular part. The hollow valve organ comprising an orifice in a wall thereof, and an outer surface of the hollow valve organ being spherical and the orifice being adapted to fluidly communicate with the aperture when the inflow control device is in an open position.

Also patent application WO2012154167 discloses a drilling system comprising a flow control device which can regulate the mud flow from a rig pump to a drill string. The device is interconnected between the pump and the manifold for controlling the mud directed into the pipe strings arranged in the wellbore. Another control device regulates the flow through a line in communication with the annulus.

Patent application US20060157282 describes equipment, associated with the drill strings, which can pressurize the annulus as a function of the density of the mud directed towards the well bottom and of the mud coming up from the well bottom. This kit is arranged in the drill pipes and may suffer damage while creating the well itself, thus becoming useless.

Patent application US2013180735 discloses equipment for annulus pressurization, which is associated with the drill pipes and arranged inside the wellbore. Like the above-mentioned patent application, this kit is inserted in the wellbore and requires that a fixed device be installed therein.

Finally, also patent application WO2013060847 describes a kit to be positioned inside the wellbore.

Patent application EP2749854 describes a computer system provided with a processor and a memory medium that can be read by the processor. The memory stores instructions which, when executed, allow the processor to receive a first reference density measured at a first pressure and a second reference density measured at a second pressure. The first and second density values are measured at a reference temperature. The measurements are carried out by using measuring devices operating on the Coriolis principle.

All of the above-mentioned solutions are applied to circulation systems wherein mud inflow towards the well bottom is interrupted during the steps of adding or removing drill pipes.

All of the above-mentioned solutions cause a very sudden and long-lasting pressure variation at the well bottom while connecting or disconnecting pipes to/from the drill string. In particular, due to the turning on/off of the pumps for circulating the mud at the bottom of the well, pressure variations occur which can destabilize the well itself, which may result in serious damage to people, environment and assets.

The solutions known in the art utilize the Coriolis principle for determining the flow rate of the fluid in the mud circulation circuit. This technological solution, though very accurate, suffers from reliability problems in that said system is easily subject to clogging, in which case it will stop working. This will result in wasted time and higher maintenance costs.

SUMMARY OF THE INVENTION

The present invention aims at solving the above-mentioned technical problems by providing a control equipment that comprises a plurality of control elements, in turn comprising measuring devices, the data collected by which, when processed by a single processing and control unit, allow controlling a mud circulation circuit. The present equipment can be associated with a mud circulation circuit, as an assembly, to allow uninterrupted circulation of the drilling mud towards the bottom of the drilling well, while keeping the pressure at the well bottom constant throughout the drilling process.

The same equipment can also be associated with an existing mud circulation circuit One aspect of the present invention relates to a control equipment.

A further aspect of the present invention relates to a mud circulation circuit.

A further aspect of the present invention relates to a control method.

Auxiliary features of the present invention are described herein.

BRIEF DESCRIPTION OF THE DRAWINGS

The features and advantages of the equipment, circuit and method according to the present invention will become apparent from the following description of different embodiments thereof and from the annexed drawings, wherein:

FIG. 2A is a block diagram representing a first embodiment of the mud circulation circuit according to the present invention, and FIG. 2B is a block diagram representing a second embodiment of the mud circulation circuit according to the present invention;

FIG. 3A shows a first inlet element, arranged between the mud circulation pump and the manifold; FIG. 3B shows a second outlet element, arranged between the outlet of the BOP device and the mud recovery tank; FIG. 3C schematically shows a third control element, arranged next to the mud recovery tank.

DETAILED DESCRIPTION OF THE PREFERREDE EMBODIMENT(S)

Figure 1:
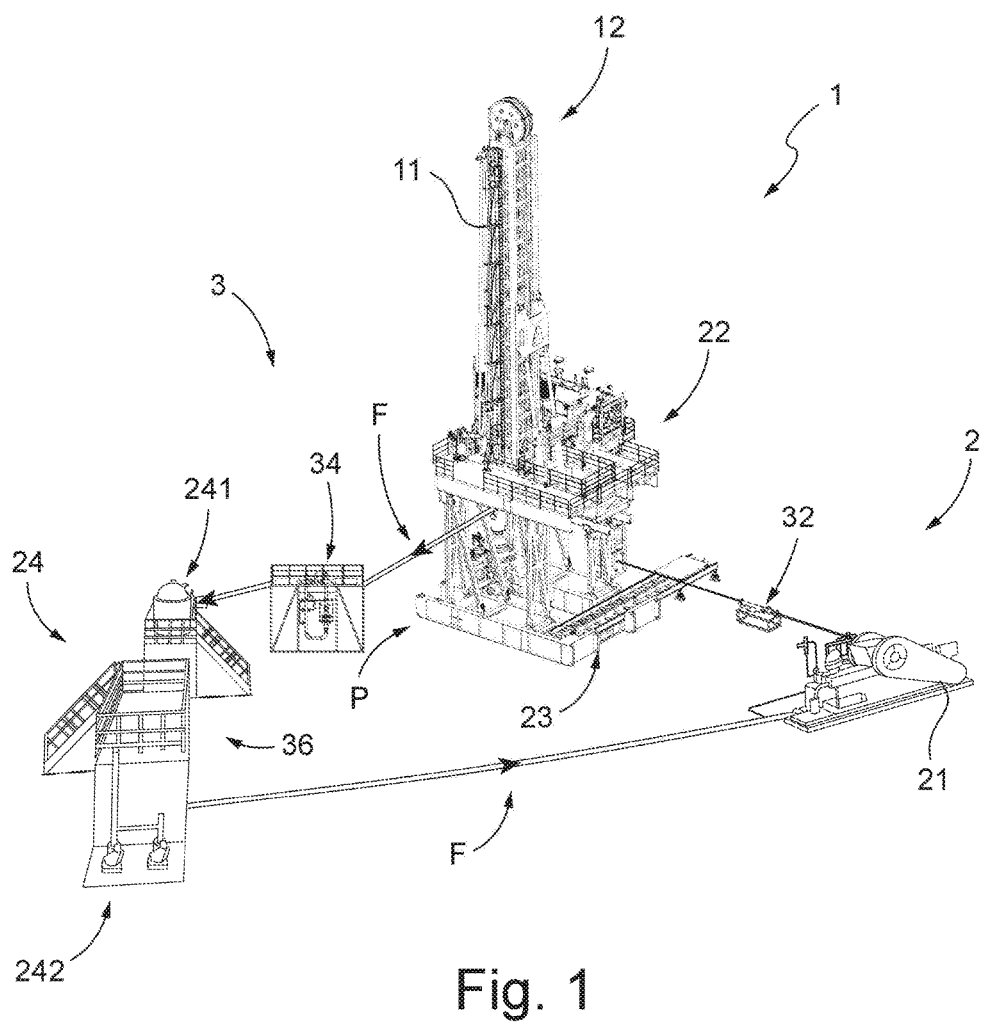
FIG. 1 schematically shows a drilling rig comprising a mud circulation circuit fitted with the equipment according to the present invention.

With reference to the above-listed drawings, control equipment 3 is particularly suitable for monitoring flows "F" of drilling mud in a mud circulation circuit 2, as shown by way of example in FIG. 2. Said mud circulation circuit 2, which comprises said control equipment 3, is particularly suitable for application to a drilling rig 1, as shown by way of example in FIG. 1.

Control equipment 3 according to the present invention comprises at least one first inlet element 32, in turn comprising at least one first measuring device 4. Said at least one first inlet element 32 is positioned in series in a drilling mud circulation circuit 2, between a mud circulation pump 21 and a collector circuit 22, for feeding drilling mud towards the bottom of a drilling well "P".

Said at least one first inlet element 32 comprises, in one possible embodiment, a safety bypass circuit arranged in parallel to the same inlet element 32.

Equipment 3 according to the present invention comprises at least one second outlet element 34, in turn comprising a second measuring device 5. Said at least one second outlet element 34 is positioned in series in drilling mud circulation circuit 2, between a blowout preventer 23, also known as BOP, arranged at the head of drilling well "P" and comprising an outlet line 231, and at least one mud collection and regeneration tank 24.

Said at least one second outlet element 34 comprises, in one possible embodiment, a safety bypass circuit arranged in parallel to the same outlet element 34.

Equipment 3 according to the present invention further comprises a processing and control unit 38 electrically connected to both said at least one first measuring device 4 and said at least one second measuring device 5. Said processing and control unit 38 can receive measurement data from said first measuring device 4 and from said second measuring device 5.

Said second measuring device 5 comprises: an inlet 51 that can be hydraulically connected directly to an outlet line 231 of said blowout preventer 23, or BOP, and an outlet 53 that can be hydraulically connected directly to at least one mud recovery and regeneration tank 24.

For the purposes of the present description, "directly connected/connectable" means that the connection between the parts does not require the interposition of additional devices.

Equipment 3 according to the present invention comprises at least one third control element 36, in turn comprising at least one third measuring device 6. Said at least one third control element 36 is positioned in series in drilling mud circulation circuit 2, next to at least one mud regeneration tank 24.

Said processing and control unit 38 is also electrically connected to said at least one third measuring device 6. Said processing and control unit 38 can receive measurement data from said third measuring device 6.

The same processing and control unit 38 is capable of processing, by means of a mathematical algorithm, the data obtained from said at least one first measuring device 4, from said at least one second measuring device 5 and from said at least one third measuring device 6, for the purpose of monitoring the circulation of drilling mud in mud circulation circuit 2. In particular for monitoring the mud flow "F".

Equipment 3 comprises at least one signaling device 7, electronically connected to said processing and control unit 38. Said at least one signaling device 7 can emit at least one visual and/or audible and/or tactile indication as a function of the data processed by said processing and control unit 38.

Equipment 3 according to the present invention advantageously does not include any devices for annulus pressurization, which devices are normally included in prior-art circulation circuits, as previously explained. In particular, the present solution does not require annulus pressurization. For the purposes of the present description, the term "annulus" refers to the space portion between the walls of drilling well "P" and drill pipes "S" or the casings, also known in technical jargon as ring or annulus.

Therefore, the present invention provides an MPD flow or microflow control system of the open type.

For the purposes of the present invention, the term "microflows" refers to any variations in the quantity of in-well fluids which is related to leakage or intake of fluid from the formation being drilled.

For the purposes of the present invention, the term "open-type MPD" refers to a flow or microflow control system in a drilling well which does not require pressurization of the annulus of the drilling well; therefore, it lacks valves or systems for choking the mud outflow from the well, and hence it does not require the installation of a rotary-type BOP at the wellhead.

The present solution does nor require pressurization of flow "F" of mud exiting drilling well "P", thus reducing the complexity of the flow control system and hence the risks for the operator of drilling rig 1.

The present invention uses the data obtained from mud regeneration tanks 24 for determining intrinsic parameters of the mud, for the purpose of monitoring the variations occurring in drilling mud flows "F". Therefore, the present invention correlates together data that are normally measured but never cross-referenced in prior-art rigs, so as to be able to continuously control flows "F" of drilling mud.

In general, said at least one first measuring device 4 and/or said at least one second measuring device 5 comprise at least one Venturi tube (45, 55) for creating a pressure variation in mud flows "F", which is necessary for taking measurements on flows "F" themselves.

Figure 2A:
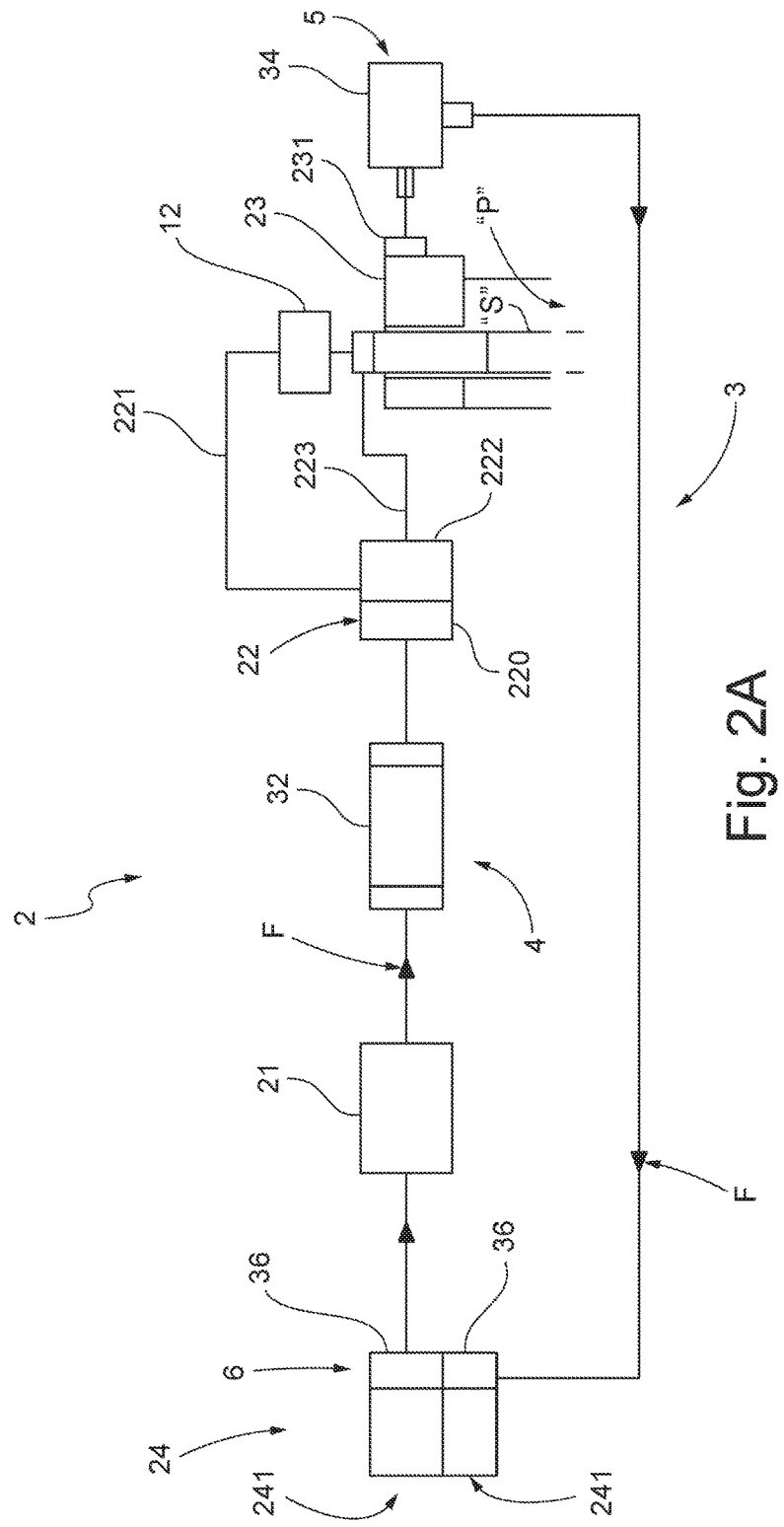
FIGS. 2A and 2B are block diagrams representing mud circulation circuits according to the present invention; in particular.

In a first embodiment of the equipment according to the present invention, as shown by way of example in the drawings, said first measuring device 4 comprises at least one inlet 41, which is directly connectable to an outlet of said mud circulation pump 21, and at least one outlet 43, which is directly connectable to an inlet portion 220 of a collector circuit 22, as shown by way of example in FIG. 2A. Said inlet portion 220 is preferably connected, in its turn, to a secondary circuit 222 for selectively directing the mud flow, for uninterrupted mud flow circulation, towards the bottom of drilling well "P".

Figure 2B:
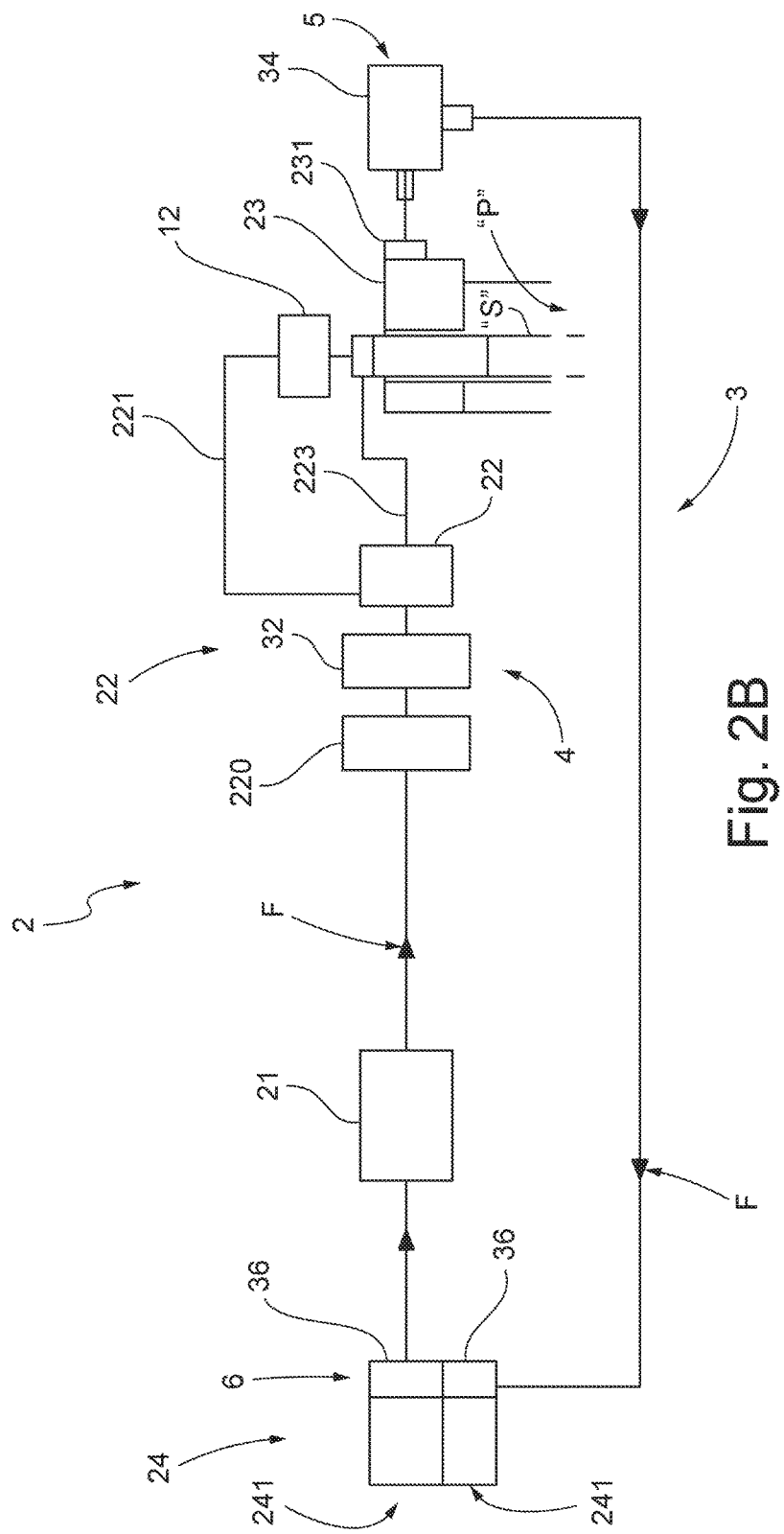

In a second embodiment, said inlet 41 of measuring device 4 is connected to an outlet of inlet portion 220 of collector circuit 22, and said at least one outlet 43 is connected to a secondary circuit 222, which can selectively direct the flow of drilling mud towards a main duct 221 or a secondary duct 223 for uninterrupted drilling mud circulation, as shown by way of example in FIG. 2B.

Said first measuring device 4 also comprises a first Venturi tube 45 fluidically connected, preferably in a direct manner, on one end to said inlet 41 of the first measuring device 4 and on the opposite end to said outlet 43 of the same measuring device 4. Said first Venturi tube 45 is capable of creating a pressure variation in mud flows "F", which is necessary for taking measurements on said flows "F".

In a preferred embodiment of the equipment according to the present invention, said second measuring device 5 comprises a second Venturi tube 55 fluidically connected, preferably in a direct manner, on one end to said inlet 51 of the second measuring device 5 and on the opposite end to said outlet 53 of the second measuring device 5. Said second Venturi tube 55 is capable of creating a pressure variation in mud flows "F", which is necessary for taking measurements on said flows "F".

Thanks to the use of Venturi tubes (45, 55) in said measuring devices (4, 5) for flow rate determination, measurements can be taken by means of equipment 3 of the present invention also for relatively shallow wellbores with large excavation debris. As aforementioned, the prior-art solutions using the Coriolis principle, if applied to wellbores with large debris, would be useless because they would be subject to clogging. In general, by at least one Venturi tube (45, 55) there are a plurality of sensors (47, 57) for taking the following measurements: differential pressure measurement; absolute pressure measurement; mud density; mud temperature and mud flow rate.

In a preferred but non-limiting embodiment, said first measuring device 4 comprises a plurality of first sensors 47, preferably arranged by the first Venturi tube 45.

The present embodiment includes at least four first sensors (47A, 47B, 47C and 47D). Preferably, said first sensors (47A, 47B, 47C and 47D) are, respectively: a differential pressure sensor 47D; an absolute pressure sensor 47A; a density sensor 47C; a temperature sensor 47B.

In a preferred but non-limiting embodiment, said second measuring device 5 comprises a plurality of second sensors 57, preferably arranged by the second Venturi tube 55.

The present embodiment includes at least four second sensors (57A, 57B, 57C and 57D). Preferably, said second sensors 57 are, respectively: a differential pressure sensor 57D; an absolute pressure sensor 57A; a density sensor 57C; a temperature sensor 57B.

In both the first measuring device 4 and the second measuring device 5, by the respective Venturi tube (45, 55), there are a plurality of sensors (47, 57) for taking the following measurements on the pressure variation in mud flow "F": differential pressure measurement; absolute pressure measurement; density; temperature, flow rate. Said plurality of sensors comprises at least four sensors (47, 57).

The flow rate measurements taken by means of at least one of said sensors (47, 57) allow obtaining a resolution of less than 100 liters per minute, thanks to the characteristics of the sensors themselves.

In a preferred but non-limiting embodiment, said at least one third measuring device 6 comprises a plurality of third sensors 63.

The present embodiment comprises at least two third sensors 63. Preferably, said third sensors 63 are level sensors.

In one possible embodiment, said third measuring device 6 comprises a third sensor 63 positioned in an inlet portion 241 of mud regeneration tank 24, through which the mud coming from the bottom of drilling well "P" is fed into tank 24. Furthermore, said third measuring device 6 comprises another third sensor 63 positioned in an outlet portion 242 of tank 24, from which mud circulation pump 21 can take the mud to be injected into drilling well "P". Said third sensors 63 are not directly installed on the pipes of mud circulation circuit 2, but on mud regeneration tank 24, in particular at least one for each portion (241, 242) of tank 24.

In general, the number and position of said third sensors 63 to be installed on mud regeneration tanks 24 also depend on the shape of tanks 24 themselves and on individual drilling rig 1 whereon equipment 3 of the invention will have to operate. Number and position are not, therefore, univocal and predefined features.

The intrinsic characteristics of the individual sensors (47, 57, 63) will not be described any further herein, since such sensors are per se known to those skilled in the art.

From a structural viewpoint, in one possible embodiment said first inlet element 32 comprises a first support structure 320 that may have a horizontal or vertical conformation, which is used for supporting all the components of the first inlet element 32 of equipment 3.

Said support structure 320 may have a horizontal or vertical shape and can be positioned on the ground, e.g. near mud circulation pump 21, or on the drill floor. Said first inlet element 32 further comprises a first electric circuit 321 acting as an electric interface between said first sensors 47, comprised in the first measuring device 4, and said processing and control unit 38. Said first electronic circuit 321 may be able to perform the function of transmitting the data to said processing and control unit 38 and also the function of conditioning the electric signals coming from said first sensors 47, possibly by pre-processing the data obtained from the measurements.

Said first inlet element 32, which is arranged in series with said mud circulation circuit 2, comprises at least one first duct portion 322 in which flows "F" of drilling mud can be made to run in order to be analyzed by said first measuring device 4. As mentioned above, the flow analysis is made by taking a plurality of measurements on mud flow "F".

Figure 3A:
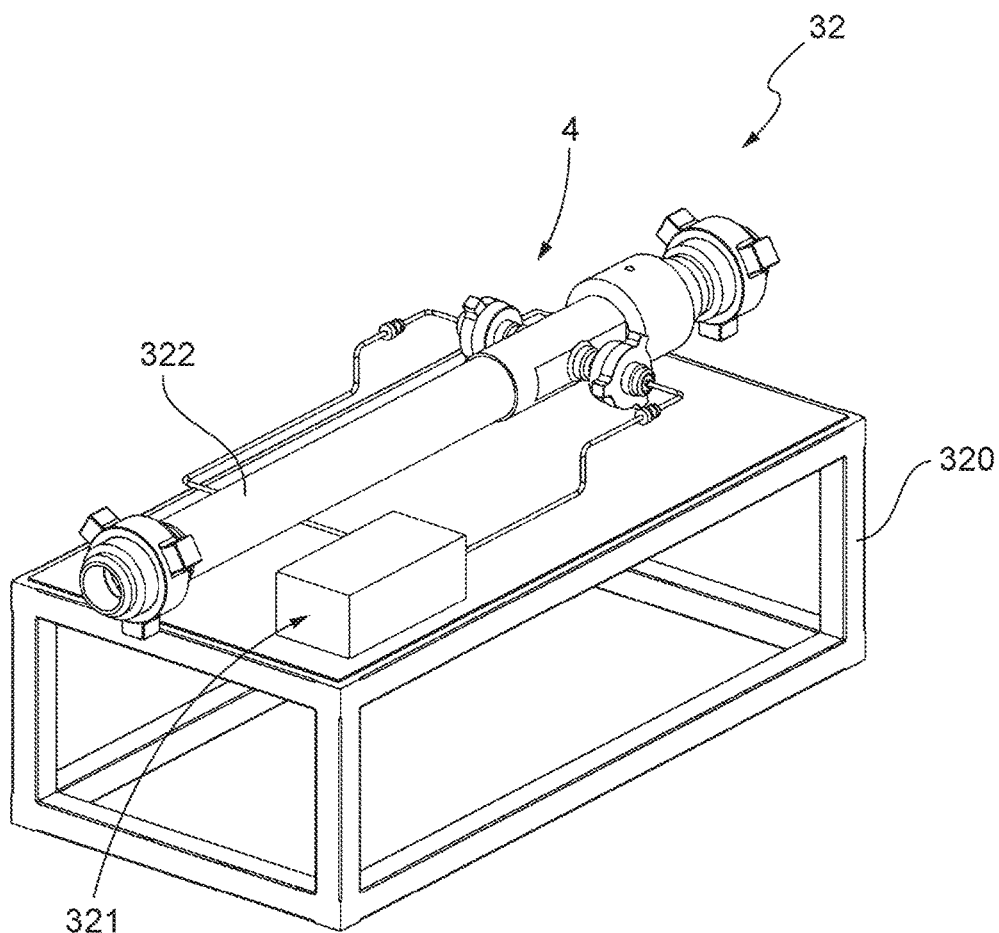
FIGS. 3A-3C show a possible exemplary but non-limiting embodiment of various parts of the equipment according to the present invention.

As shown by way of example in FIG. 3A, said first support structure 320 may be provided in the form of a bench, whereon said first duct portion 322 and said first electric circuit 321 are arranged, in addition to said first measuring device 4, or may be arranged vertically in a column-like fashion, e.g. on the drill floor, or may be integrated into other devices of the rig, such as collector circuit 22.

Still from a structural viewpoint, in one possible embodiment said second outlet element 34 comprises a first support structure 340 for supporting all the components of the second outlet element 34 of equipment 3. Said second outlet element 34 further comprises a second electric circuit 341 acting as an electric interface between said second sensors 57, comprised in the second measuring device 5, and said processing and control unit 38. Said second electronic circuit 341 may be able to perform the function of transmitting the data to said processing and control unit 38 and also the function of conditioning the electric signals coming from said second sensors 57, possibly by pre-processing the data obtained from the measurements.

Said second outlet element 34, which is arranged in series with said mud circulation circuit 2, comprises at least one second duct portion 342, in which flows "F" of drilling mud can be made to run in order to be analyzed by means of said second measuring device 5.

Figure 3B:
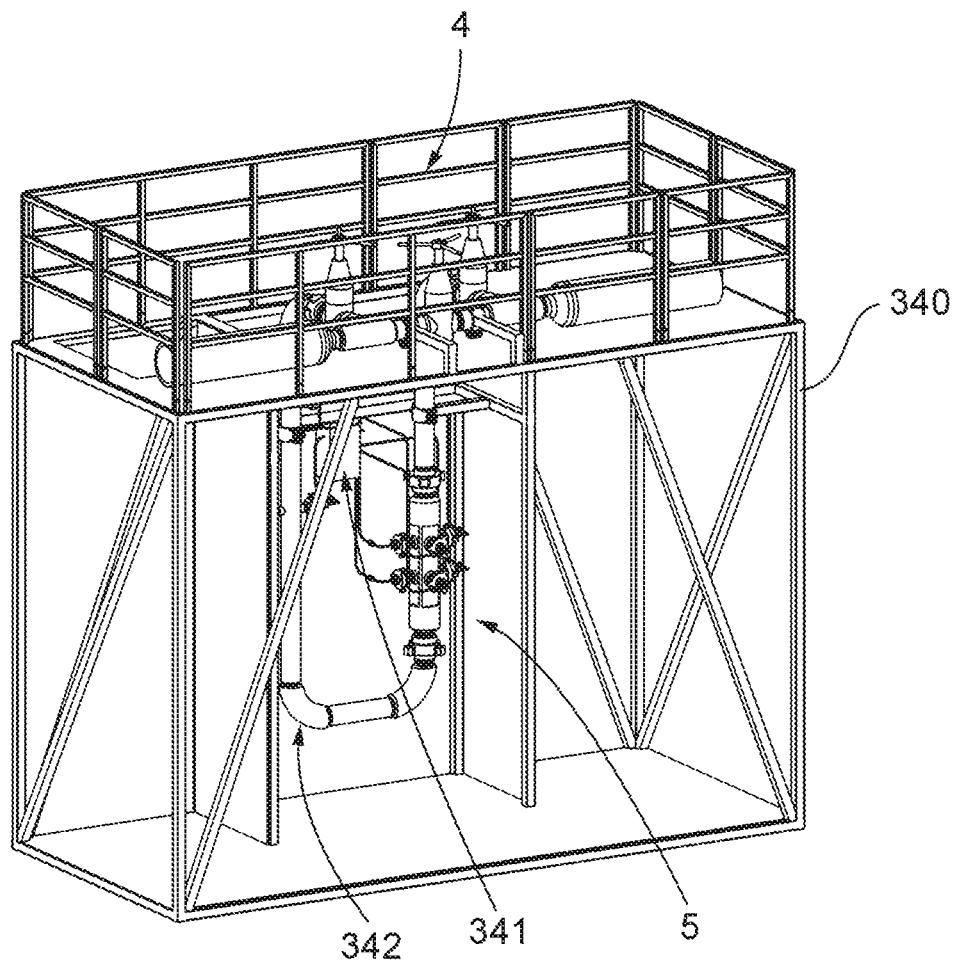

In a preferred embodiment, said second duct portion 342 comprises also at least one diverter circuit 344 acting as a safety circuit that bypasses measuring device 5 in case of emergency or maintenance. As shown by way of example in FIG. 3B, said second support structure 340 may be provided in the form of a lattice framework suitable for supporting said second duct portion 342 and said second electric circuit 341, in addition to said second measuring device 5. Preferably, as shown in FIG. 3B, said second support structure 340 comprises a gangway that allows an operator to get to said second electronic circuit 341 and/or second circuit portion 342 and/or said diverter circuit 344.

From a structural viewpoint, in one possible embodiment, described herein by way of illustrative and non-limiting example, said third control element 36 comprises at least one support structure capable of containing at least some of the components of the third control element 36 of equipment 3.

Said at least one support structure is positioned inside mud regeneration tank 24, in particular, at least one inside inlet portion 241 and another one inside outlet portion 242. Each one of said support structures is adapted to contain at least one third sensor 63. Said third control element 36 further comprises a third electric circuit 361 acting as an electric interface between said third sensors 63, comprised in the third measuring device 6, and said processing and control unit 38. Said third electronic circuit 361 may be able to perform the function of transmitting the data to said processing and control unit 38 and also the function of conditioning the electric signals coming from said third sensors 63, possibly by pre-processing the data obtained from the measurements.

Said third control element 36, being arranged in series with said mud circulation circuit 2, comprises at least a first part, positioned in said inlet portion 241 of mud regeneration tank 24, and a second part, positioned in outlet portion 242 of tank 24.

Figure 3C:
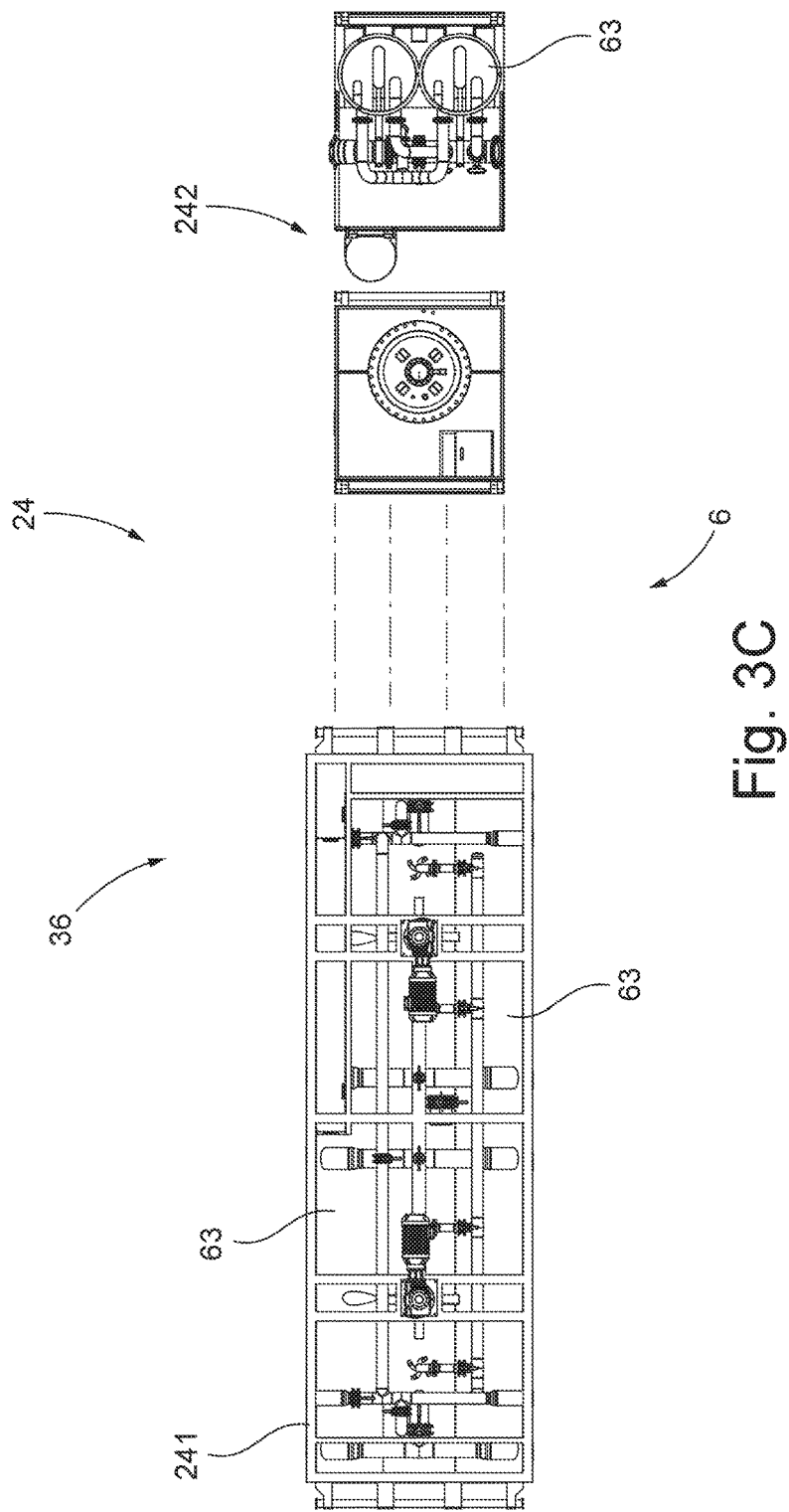
Figure 4:
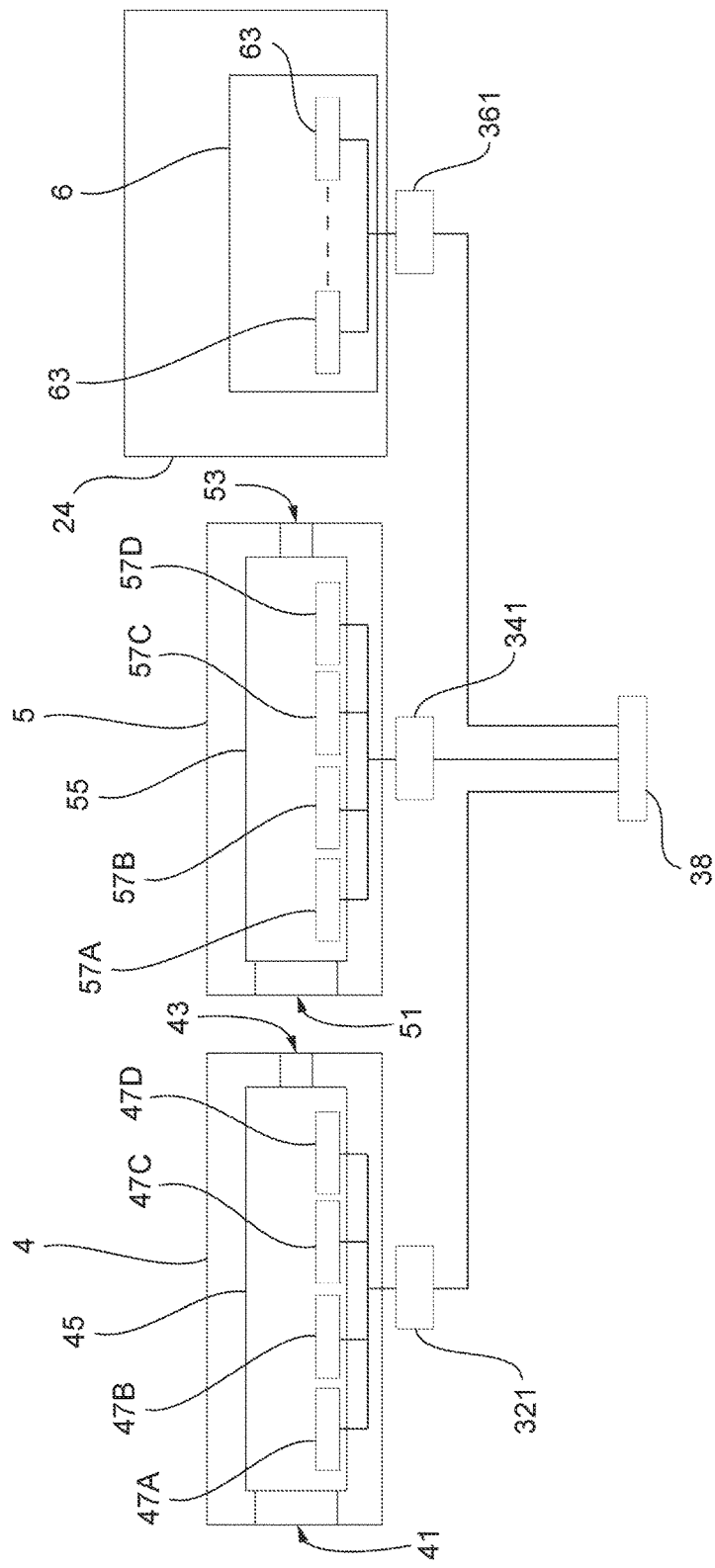
FIG. 4 shows a block diagram of the measuring devices comprised in the equipment according to the present invention.
Figure 5:
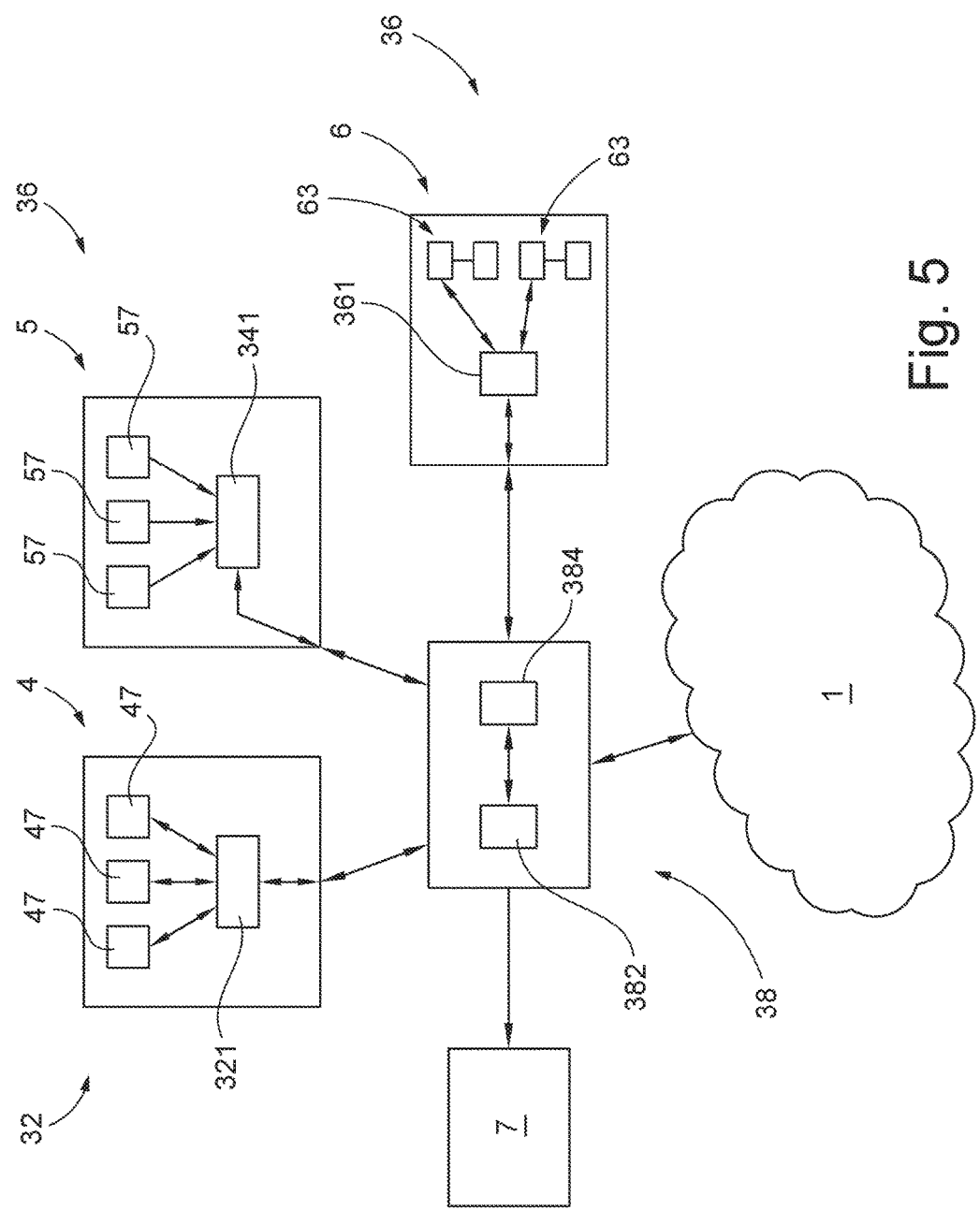
FIG. 5 shows a block diagram of the electric connections between the measuring devices and a processing and control unit comprised in the equipment according to the present invention.
Figure 6:
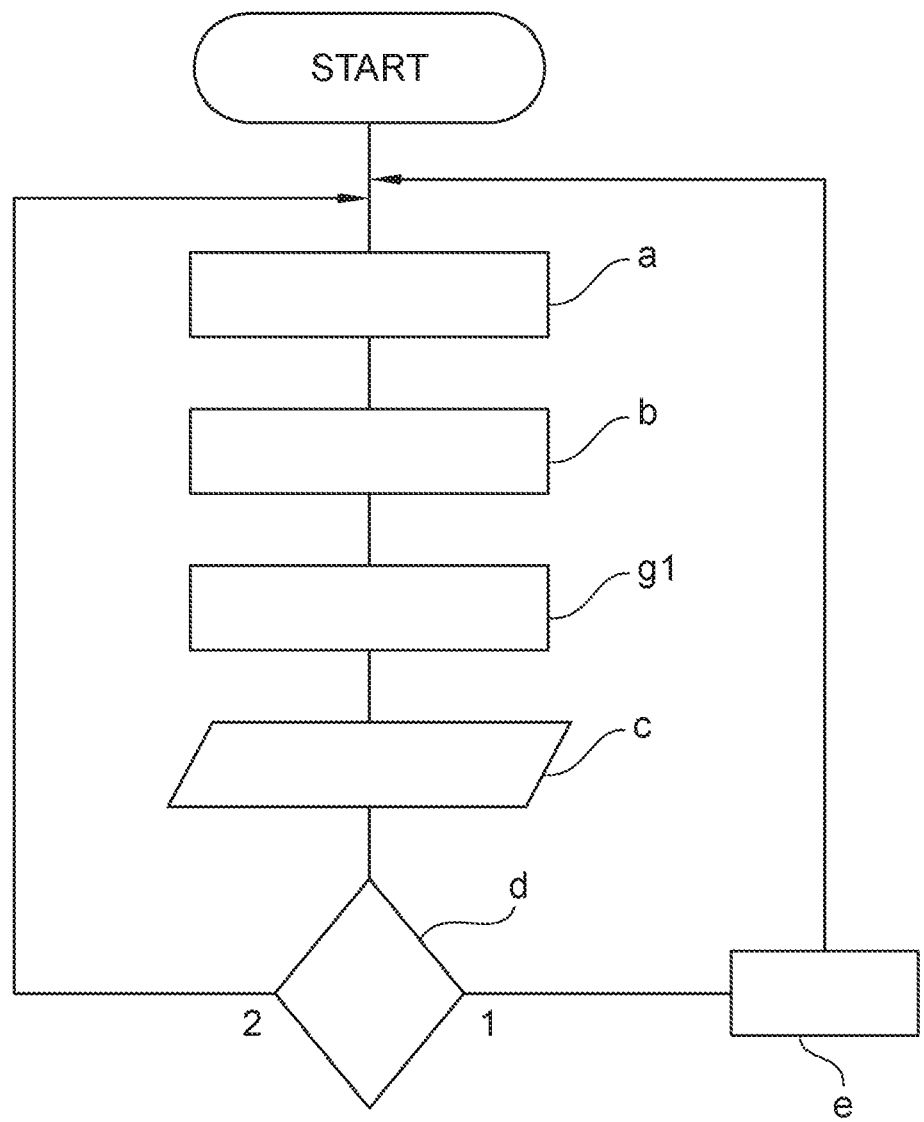
FIG. 6 shows a flow chart of the control method according to the present invention.

In the embodiment illustrated by way of example in FIG. 3C, said third control element 36 is so designed that at least two third sensors 63 of the third measuring device are located inside inlet portion 241 of mud regeneration tank 24. Furthermore, said third control element 36 is so designed that at least one third sensor 63 of the third measuring device 6 is located inside outlet portion 242 of the same mud regeneration tank 24.

In a particularly advantageous embodiment, said third control element 36 comprises at least one containment vessel in which the third measuring device 6 can take at least a part of the measurements. Each containment vessel is fluidically connected to mud regeneration tank 24, in particular to at least one of outlet portion 242 and inlet portion 241 of tank 24. Preferably there are two containment vessels, one fluidically connected, preferably in a direct manner, to inlet portion 241 of tank 24, and another one fluidically connected, preferably in a direct manner, to outlet portion 242 of tank 24. Said vessel may be, for example, a specially designed tank portion or a vessel connected to existing mud regeneration tank 24.

In one possible embodiment, said containment vessels are provided as two additional tanks that are much smaller than mud regeneration tanks 24 already included in drilling rig 1. This solution allows monitoring much smaller (e.g. halved) variations in mud flow "F" compared to the systems currently available on the market, at the aforementioned resolution of 100 liters/minute.

Said processing and control unit 38 is preferably implemented by means of electronic devices, such as, for example, an electronic control unit, e.g. installed in a remote location with respect to mud circulation circuit 2, e.g. near the control unit of drilling rig 1 and/or in proximity to the doghouse.

Preferably, said processing and control unit 38 comprises a controller or processor device 382, e.g. a microprocessor or a microcontroller, for coordinating, controlling and processing the data coming from the various elements (32, 34, 36) of equipment 3. Said processing and control unit 38 further comprises at least one memory medium 384, preferably a non-volatile one, for storing at least a part of the data coming from the various elements (32, 34, 36) of equipment 3, and also for containing a sequence of logic/operating steps that processing and control unit 38 will have to carry out in order to monitor flows "F" in mud circulation circuit 2. Said sequence of operating steps comprises a computation algorithm, which is used by processing and control unit 38 for deciding about the activation of said at least one signaling device 7, the latter being electrically connected to said processing and control unit 38.

Said signaling device 7 can emit at least one visual and/or audible and/or tactile indication as a function of the data processed by said processing and control unit 38. In particular, said signaling device 7 will emit a signal if the processed data fall out of a preset parameter range.

The sequence of steps carried out for monitoring the flows in mud circulation circuit 2 and the associated computation algorithm will be illustrated more in detail below.

In one possible embodiment, said signaling device 7 consists of at least one electronic device capable of generating an indication perceivable by the operator. In one possible embodiment, said electronic device can return a visual indication, e.g. by turning on a warning lamp or by displaying a signaling image on a monitor. In one possible embodiment, said electronic device can return an audible indication having a predefined signaling sound. Said electronic device may be a siren positioned in a doghouse, wherein the latter should be soundproofed against the noise generated by the rig.

In one possible embodiment, said electronic device can return a tactile indication, e.g. by generating a vibration of an operator seat and/or of a knob, such that it will be perceived by the user. Said electronic devices may be used individually or appropriately combined together as required.

Said signaling device 7 generates a visual and/or audible indication that can be seen and/or heard by the operator that controls top drive 12, or driller, of drilling rig 1, and/or by the operator that controls mud circulation system 2, and/or by the operator that supervises the operation of entire drilling rig 1.

In a preferred embodiment of equipment 3 according to the present invention, each first inlet element 32, each second outlet element 34, each third control element 36 and said processing and control unit 38 are independent and individually replaceable, thus making up an equipment or kit applicable to any existing mud circulation circuit 2.

The present embodiment of the equipment as a kit that can be installed in and removed from a mud circulation circuit 2 allows attaining the advantage of the present invention also with an existing mud circulation circuit, without having to re-design and/or modify the mud circulation circuit.

With reference to FIGS. 2A and 2B, mud circulation circuit 2 comprises at least one mud circulation pump 21, at least one collector circuit 22, in turn comprising an inlet portion 220 and a secondary circuit 222, the latter being capable of selectively diverting the mud flow towards a main duct 221 for mud circulation and towards a secondary duct 223 for uninterrupted drilling mud circulation. The same mud circulation circuit 2 comprises a blowout preventer or BOP 23, in turn comprising at least one outlet line 231 and at least one mud recovery and regeneration tank 24. Circuit 2 is particularly suitable for including a control equipment 3 as previously described.

The same circuit includes no devices for pressurizing the annulus of drilling well "P".

Preferably, said circuit 2 is a circuit for uninterrupted circulation of drilling mud towards the bottom of drilling well "P" in any operating configuration of a drilling rig 1.

For the purposes of the present description, the term "circuit for uninterrupted mud circulation" refers to a mud circulation circuit capable of ensuring a substantially constant mud flow towards the bottom of the drilling well during any operating phase of the drilling rig.

Uninterrupted mud circulation is attained by implementing, in circuit 2, a collector circuit 22 comprising an inlet portion 220 and a secondary circuit 222, the latter being also known as manifold. Said collector circuit comprises a plurality of valve means, in particular said secondary circuit 222 comprises valve means configured for appropriately diverting the mud flow towards either a main duct 221 or a secondary duct 223 for uninterrupted mud circulation, depending on the operating step being carried out by drilling rig 1. In brief, said collector circuit 22, in particular secondary circuit 222, directs the mud flow towards main circuit 221, i.e. towards top drive 12 located on mast 11 of drilling rig 1, when rig is in the drilling phase; on the contrary, collector circuit 22, in particular secondary circuit 222, diverts the fluid flow towards secondary duct 223, which is connected to a radial aperture of a drill pipe "S", when drill pipes "S" are added or removed, so as to keep constant the supply of drilling mud towards the bottom of well "P" in any operating configuration of the rig. For this purpose, as the man skilled in the art knows, drill pipes "S" comprise a valve device capable of selectively opening and closing the axial and radial apertures of the same drill pipes "S".

Combined with equipment 3 according to the present invention, uninterrupted circulation ensures that there are always two active protections that are monitored against undesired leakage, also known as blowout, thus contributing to eliminating the need for pressurizing the annulus when adding or removing drill pipes "S".

Aiming at improving the safety of mud circulation circuit 2 and of drilling rig 1 as a whole, in one possible embodiment the electronic devices included in mud circulation circuit 2 are electrically connected to processing and control unit 38 of control equipment 3, so as to provide a general picture of the operation of mud circulation circuit 2.

In general, the method for monitoring mud flows "F" in a mud circulation circuit 2 of a drilling rig 1 according to the present invention comprises the following steps:

a. taking measurements on mud flow "F" through at least one first measuring device 4 located upstream of a drilling well "P" relative to the direction of mud flow "F";

b. taking measurements on mud flow "F" through at least one second measuring device 5 located downstream of drilling well "P" relative to flow "F";

c. processing, through a processing and control unit 38, the measurement data obtained during the preceding steps, generated by said first measuring devices 4 and by said second measuring devices 5;

d. executing a control step, wherein:
   if the processed data obtained at step c. are out of a preset parameter range, a signaling step e. will be executed, wherein a fault will be signaled through a signaling device 7;
   if the processed data obtained at step c. are within a preset parameter range, the steps of the following method will be repeated at predefined intervals, preferably continuously over time, more preferably in real time.

The execution of the above-mentioned steps provides a real-time indication about the arising of a problem in mud circulation circuit 2, thus allowing the operator to take action immediately. Therefore, no time elapses between the actual arising of the problem and the instant at which signalling device 7 is activated, thus avoiding useless and dangerous delays. In other words, the present monitoring method is executed in real time; for example, the cycle of steps a.-d. is executed at regular intervals, at least once every second.

The method according to the present invention comprises a further step g1. of taking measurements, to be executed prior to step c., wherein measurements are taken through at least one third measuring device 6 located at a mud regeneration tank 24.

Moreover, according to the method of the present invention, during the processing step c. the processing and control unit 38 processes also the measurement data obtained at step g1., generated by said at least one third measuring device 6.

The control method includes no steps wherein actuators are activated in order to pressurize the annulus during some operating phases of drilling rig 1, in particular when the mud circulation pump is off or the mud flow is no longer directed towards the well bottom.

In a preferred but non-limiting embodiment, a "model-based" algorithm is executed during the processing step.

For the purposes of the present description, the term "model-based algorithm" refers to an algorithm based on a mathematical model supported by mathematical, algebraic or differential equations, which, by using the data collected by the various sensors, can calculate output parameters that, when out of preset ranges, will generate alarms.

The method according to the present invention is particularly suitable for application to mud circulation circuits 2 capable of ensuring uninterrupted circulation of drilling mud towards the bottom of drilling well "P" in any operating configuration of a drilling rig 1.

The "model-based" typology, since it is ductile and easy to implement, allows characterizing complex systems in a simple and rapid manner.

The method according to the present invention is based on measurements taken by said first measuring device 4, said second measuring device 5 and said third measuring device 6. Control equipment 3 according to the present invention can take measurements on the mud flow, such as, for example, density and/or rate and/or pressure, in order to determine possible dangerous conditions.

The method allows, therefore, detecting even small flows of layer formation fluid into the well and/or small leakages of mud from the well to the rocky formation being drilled.

The method can return an indication, e.g. a visual and/or audible and/or tactile one, which works as an alarm when the collected data show a shift between the actual situation and a range of predefined values.

The present solution allows monitoring flows "F", in particular microflows, during every operating step of a drilling rig 1, in particular while drilling oil wells, when mud circulation circuits 2 in use are of the type ensuring uninterrupted drilling mud circulation.

The present solution ensures that, during the operating steps of adding and removing drill pipes, the hydraulic barrier of a drilling rig will not only consist of the statics of the drilling mud, but also of a dynamic barrier capable of keeping a state of equilibrium at the well bottom by exerting a pressure given by the sum of the static pressure of the mud and the load losses of the annulus of the well itself. In prior-art solutions, during said steps the hydraulic barrier is only provided by the statics of the drilling mud, and the pressure at the well bottom undergoes continual variations, thus being dangerous.

With equipment 3 of the present invention, the hydraulic barrier generated by the mud is also kept constantly under control, in that, thanks to continuous monitoring, it is possible to verify that the barrier always meets the safety requirements of durability and reliability.

Control equipment 3 according to the present invention and the associated control method are suitable for creating a managed/controlled pressure drilling system, also known in the industry as MPD.

The present solution is particularly suitable for application to on-shore and off-shore drilling rigs 1.

Furthermore, the present solution is particularly suitable for creating deep wells, as well as for application to off-shore drilling systems in deep or ultra deep water.

The present solution is particularly suitable for drilling high-pressure and high-temperature wells.

The control circuit according to the present invention is applicable to existing drilling well by arranging a first element 32 of equipment 3 upstream of drilling well "P" (relative to the direction of circulation of mud flow "F"), a second element 34 downstream of drilling well "P", and a third element at mud regeneration tanks 24, substantially integrating them into mud circulation circuit 2.

It must be underlined that the present equipment allows creating a system for controlling microflows in an open-type well, i.e. a system not requiring annulus pressurization. It follows that, downstream of drilling well "P", the present solution does not require a control system to control and/or manage the choking of the circuit, e.g. by acting upon choke or diverter valves, as specified in the discussion about the prior art. The present invention allows letting the flow free to exit, as in traditional drilling and circulation.

The present solution allows improving the safety of drilling rigs.

The present solution allows ensuring the constant presence of two protection barriers, as previously specified, during all the operating phases of the drilling rig.

The present solution allows reinforcing the hydraulic barrier by increasing the safety level during the drilling phases, even when drilling oil wells in critical environments, such as deep drilling, high-pressure and high-temperature drilling, horizontal wells and deep water drilling.

Combined with uninterrupted circulation of the drilling mud during every operating phase, the present control equipment allows improving the safety of the drilling rig in a simple and economical manner.

The present solution allows obtaining a mechanical barrier and a hydraulic barrier which are independent of each other. The same barriers will be tested and reliable over time, because they will always be present in any operating configuration of the drilling rig and for any type of drilling operation, even in critical environments.

The present invention provides several technical advantages under various aspects, which cannot be attained by prior-art solutions.

As far as sensors are concerned, the second outlet element 34 can be designed for lower pressure values compared to prior-art solutions because the annulus is not pressurized, resulting in clear advantages in terms of easiness of production and manufacturing costs.

Mud circulation circuit 2, and therefore drilling rig 1, that comprises equipment 3 according to the present invention is more efficient and versatile, as well as easier to install. Being simple, i.e. less complex of prior-art systems, equipment 3 according to the present invention is also easier to install on circulation circuit 2 and on drilling rig 1.

A further important advantage attainable by the present solution relates to the stability of drilling well "P". In fact, since annulus pressurization is not required, there is no risk of undesired collapses of the well walls due to downstream bottlenecks. Unlike prior-art solutions, the present solution tries to preserve as much as possible the natural outflow of the mud in the well, by exploiting the uninterrupted circulation of the mud towards the well bottom, in any operating condition of drilling rig 1.

Sensors (47, 57) comprised in the first measuring device 4 and in the second measuring device 5 take measurements that are essentially different from those commercially available. As already specified, both upstream and downstream of the well, all differential pressure, absolute pressure, density and temperature sensors are preferably installed on a Venturi tube (45, 55), and are optimized and realized in such a way as to be properly functional for this application. Said sensors are optimized from an engineering viewpoint as concerns the physical connection to the respective Venturi tube, and also as concerns the electric connection to processing and control unit 38, e.g. via an electronic circuit (341, 361).

Control equipment 3 according to the present invention can be removed from mud circulation circuit 2 without affecting the operation of the circuit itself and/or of rig 1.

The same equipment 3 can be associated with an existing mud circulation circuit without requiring any modifications to the structure of the mud circulation circuit.

The equipment according to the present invention is particularly interesting when used in combination with mud circulation circuits suitable for ensuring uninterrupted mud circulation towards the bottom of the drilling well.

Any structural or electric changes made to the above described elements, which are obvious to a man skilled in the art, are intended to be comprised in the present description.

REFERENCE NUMERALS

Drilling rig 1
Mast 11
Top drive 12
Mud circulation circuit 2
Mud circulation pump 21
Collector circuit 22
Inlet portion 220
Main duct 221
Secondary circuit 222
Secondary duct 223
Blowout preventer or BOP 23
Outlet line 231
Mud regeneration tank 24
Inlet portion 241
Outlet portion 242
Control equipment 3
First inlet element 32
First support structure 320
First electric circuit 321
First duct portion 322
Second outlet element 34
Second support structure 340
Second electric circuit 341
Second duct portion 342
Diverter circuit 344
Third control element 36
Third electric circuit 361
Processing and control unit 38
Controller or processor device 382
Memory medium 384
First measuring device 4
Inlet 41
Outlet 43
First Venturi tube 45
First sensor 47
Absolute pressure sensor 47A
Temperature sensor 47B
Density sensor 47C
Differential pressure sensor 47D
Second measuring device 5
Inlet 51
Outlet 53
Second Venturi tube 55
Second sensor 57
Absolute pressure sensor 57A
Temperature sensor 57B
Density sensor 57C
Differential pressure sensor 57D
Third measuring device 6
Third sensor 63
Signaling device 7
Flows F
Drilling well P
Drill pipes S

The invention claimed is:

1. A drilling mud circulation circuit for drilling wells, wherein said drilling mud circulation circuit comprises a circuit for continuously circulating drilling mud toward a bottom of a drilling well in any operating configuration of a drilling rig; said drilling mud circulation circuit comprising:
at least one mud circulation pump;
at least one collector circuit, the at least one collector unit comprising:
an inlet portion;
a secondary circuit selectively diverting mud flow toward a main duct for mud circulation; and
a secondary duct for uninterruptedly circulating drilling mud;
a blowout preventer (BOP comprising an outlet line;
at least one mud regeneration tank;
equipment for monitoring flows of drilling mud in the drilling mud circulation circuit; the control equipment being an open managed/controlled pressure drilling (MPD) flow or microflow control system, the control equipment comprising:
at least one first inlet element comprising at least one first measuring device, said at least one first inlet element being positioned in series in the drilling mud circulation circuit, between the at least one mud circulation pump and the collector circuit, for feeding drilling mud towards the bottom of a drilling well;
at least one second outlet element, the at least one second outlet element comprising at least one second measuring device, said at least one second outlet element being positioned in series in the drilling mud circulation circuit, between the blowout preventer at a head of the drilling well and said at least one mud regeneration tank;
a processing and control unit being electrically connected to both said at least one first measuring device and said at least one second measuring device; said processing and control unit being capable of receiving measurement data from said first measuring device and from said second measuring device;
said second measuring device comprising:
an inlet hydraulically connected directly to an outlet of said blowout preventer;
an outlet hydraulically connected directly to said at least one mud regeneration tank;
at least one third control element, in turn comprising at least one third measuring device, said third control element being positioned in series in the drilling mud circulation circuit next to said at least one mud regeneration tank;
said processing and control unit is:
electrically connected to said at least one third measuring device;
capable of receiving measurement data from said third measuring device; and
capable of processing, by a model-based mathematical algorithm, the data obtained from said at least one first measuring device, from said at least one second measuring device and from said at least one third measuring device, for monitoring flow of drilling mud circulating in the mud circulation circuit;

wherein electronic devices of the mud circulation circuit are electrically connected to the processing and control unit;

a signalling device, electrically connected to said processing and control unit; said signalling device being capable of emitting at least one visual and/or audible and/or tactile indication as a function of data processed by said processing and control unit;

said at least one second measuring device comprising a first Venturi tube fluidically connected on one end to said inlet and on an opposite end to said outlet, said first Venturi tube creating a pressure variation in the mud flows for taking measurements on said mud flows.

2. The circuit according to claim 1, wherein said first measuring device comprises at least one inlet, at least one outlet, and a second Venturi tube fluidically connected on one end to said inlet of the first measuring device and on the opposite end to said outlet of the first measuring device, said second Venturi tube being capable of creating a pressure variation in the mud flows, which is necessary for taking measurements on said flows.

3. The circuit according to claim 2, comprising a plurality of sensors near at least one of the first or second Venturi tubes, for taking the following measurements on the mud flows: differential pressure measurement; absolute pressure measurement; mud density; mud temperature; and rate of the flow.

4. The circuit according to claim 3, comprising at least four of the sensors.

5. The circuit according to claim 2, wherein said at least one first measuring device comprises:

at least one inlet fluidically connected directly to an outlet of an inlet portion of the collector circuit; and at least one outlet connected to a secondary circuit comprised in the collector circuit;

said secondary circuit selectively directing the drilling mud flow towards either a main duct or a secondary duct for uninterrupted drilling mud circulation.

6. The circuit according to claim 1, wherein said at least one third measuring device comprises at least two level sensors, wherein a third sensor is positioned in an inlet portion of the tank, through which the mud coming from the bottom of the drilling well is fed into said tank, and another third sensor is positioned in an outlet portion of the tank, from which the pump takes the mud to be injected into the drilling well.

7. The circuit according to claim 1, wherein each first inlet element, each second outlet element, each third control element, and said processing and control unit are independent and individually replaceable.

8. The circuit according to claim 1, wherein said third control element comprises at least one containment vessel in which the third measuring device takes at least a part of the measurements.

9. A method for monitoring mud flows in the mud circulation circuit according to claim 1, the circuit ensuring uninterrupted circulation of drilling mud towards the bottom of the drilling well in any operating configuration of the drilling rig;

the method comprising the following steps:
a) taking measurements on a mud flow through said at least one first measuring device located upstream of the drilling well relative to a direction of the mud flow;
b) taking measurements on the mud flow through said at least one second measuring device located downstream of the drilling well;
c) processing, through said processing and control unit, measurement data obtained during the preceding steps, generated by said at least one first measuring device and by said at least one second measuring device;
d) executing a control step wherein:
if the processed data obtained at step c) are out of a preset parameter range, a signalling step e) is executed, wherein a fault will be signaled through the signaling device;
if the processed data obtained at step c) are within a preset parameter range, the steps of the following method are repeated at predefined intervals;
wherein:
an additional step g) of taking measurements executed prior to step g);
during said step g), measurements are taken through at least one third measuring device located at the mud regeneration tank; and wherein during the processing step c), the processing and control unit processes the measurement data obtained at step g), generated by said at least one third measuring device.

10. A method according to claim 9, wherein the model-based algorithm is executed during the processing step.

* * * * *